(12) United States Patent
Nam et al.

(10) Patent No.: US 7,340,387 B2
(45) Date of Patent: Mar. 4, 2008

(54) CONTROL ROD DRIVING SIMULATOR FOR VERIFICATION OF CONTROL ROD DRIVING MECHANISM CONTROL SYSTEM OF ATOMIC POWER PLANT

(75) Inventors: Chae-Ho Nam, Changwon-si (KR); Jung-Surk Sur, Daegu (KR); Chang-Ho Cho, Changwon-si (KR)

(73) Assignee: Doosan Heavy Industries & Construction Co., Ltd., Gyeongsangnam-do (KR)

( * ) Notice: Subject to any disclaimer, the term of this patent is extended or adjusted under 35 U.S.C. 154(b) by 459 days.

(21) Appl. No.: 10/886,762

(22) Filed: Jul. 8, 2004

(65) Prior Publication Data
US 2005/0018803 A1 Jan. 27, 2005

(30) Foreign Application Priority Data
Jul. 12, 2003 (KR) .................. 10-2003-0047614
Jun. 22, 2004 (KR) .................. 10-2004-0046407

(51) Int. Cl.
*G06F 17/50* (2006.01)
(52) U.S. Cl. ............... 703/18; 703/1; 703/6; 703/7; 376/245; 376/277
(58) Field of Classification Search .............. 703/18, 703/6, 7
See application file for complete search history.

(56) References Cited

U.S. PATENT DOCUMENTS

| 4,857,261 A | * | 8/1989 | Marshall et al. ............ 376/248 |
| 5,930,321 A | * | 7/1999 | Harkness et al. ........... 376/298 |
| 5,963,610 A | * | 10/1999 | Falvo et al. ................ 376/259 |
| 6,810,099 B2 | * | 10/2004 | Nakamaru et al. .......... 376/293 |
| 2005/0207524 A1 | * | 9/2005 | Knecht et al. .............. 376/209 |

\* cited by examiner

*Primary Examiner*—Paul Rodriguez
*Assistant Examiner*—Michael Wilser
(74) *Attorney, Agent, or Firm*—Merchant & Gould P.C.

(57) ABSTRACT

A control rod driving simulator has a control rod driving unit having a plurality of coil members vertically mounted therein, a control rod mounted vertically movably through the centers of the coil members, a cart having a reserve tank storing cooling water, a cooling fan for air-cooling the coil members and a control unit for controlling an operation of the cooling fan, a box containing a part of the control rod and a checking unit for checking the vertical movement of the control rod. When the simulator is connected to an actual control rod driving mechanism and a wave profile of current flowing in the coil members of the control rod driving unit is measured, a same wave profile of current as when it is connected to an actual control rod driving mechanism provided to a reactor core can be obtained.

6 Claims, 5 Drawing Sheets

CONTROL ROD DRIVING SIMULATOR FOR VERIFICATION OF CONTROL ROD DRIVING MECHANISM CONTROL SYSTEM OF ATOMIC POWER PLANT

CROSS-REFERENCE TO RELATED APPLICATIONS

This application claims all benefits of Korean Patent Applications Nos. 10-2003-0047614 filed on Jul. 12, 2003 and 10-2004-0046407 filed on Jun. 22, 2004 in the Korean Intellectual Property Office, the disclosures of which are incorporated herein by reference.

BACKGROUND OF THE INVENTION

1. Field of the Invention

The present invention relates to a control rod driving simulator for verification of a control rod driving mechanism control system of an atomic power plant, in particularly to a control rod driving simulator wherein a driving mechanism having a same condition as a control rod driving mechanism equipped to a reactor core is connected to a control rod driving mechanism control system in executing a preliminary operational test, so that it is possible to check the problems occurring in the control rod driving mechanism control system in advance in a process of a preliminary operation and thus to obtain confidence and stability of the control rod driving mechanism control system without causing a change of a degree of nuclear reaction of the reactor core as the control rod moves.

2. Description of the Related Art

Generally, a control rod driving mechanism of an atomic reactor serves to control a nuclear reaction of the atomic reactor by withdrawing or inserting a control rod using electromagnetic force and thus to regulate electrical output of an atomic power plant.

The control rod is stepwisely withdrawn or inserted and a series of sequence operations having 6~7 stages should be sequentially carried out to move one step. When any operation of the sequence operations is not properly carried out in a mechanical or electrical manner, it can occur that the control rod is not moved or drops downwards.

Since these situations are very important in connection with a safety work of the atomic power plant and an efficient utilization of nuclear fuel, a check of the sequence operations is the most important matter in designing and embodying a control rod control mechanism. To check the sequence operations, a method of signal-processing a wave form of current flowing in a coil member and thus determining whether the control rod is operated or not is recently used.

The prior simulator for verifying the method cannot provide a same load as a control rod driving mechanism that is actually equipped to an atomic reactor of an atomic power plant, because it carries out verification only with a control rod driving mechanism having not a control rod. Accordingly, it is impossible to execute a correct verification of a control rod driving mechanism control system.

The above-mentioned control rod driving mechanism consists of various coil members and the control rod driving mechanism control system comprises a control circuit and a power circuit element, etc. and is connected to the control rod driving mechanism.

In the prior simulator, upper and lower parts thereof are closed and cooling water is supplied therein by a separate pump. The cooling water is filled up in the whole simulator. And then, two coil members are mounted to each of exterior upper and lower parts of the simulator, respectively.

When an electric power is applied to the coil members, the temperature thereof is increased. Since electromagnetic properties such as resistance are changed as the temperature is increased, it is required to maintain the temperatures of the coil members of the simulator to be same as those of the coil members of an actual control rod driving mechanism of an atomic power plant. Accordingly, when the temperatures of the coil members are increased above the actual temperatures, a cooling fan is provided to cool it. The cooling fan is initially operated at low speed. When the operation time is 30 minutes or more, or the atmosphere temperature is 32.22° C. or more, the fan is set to operate at high speed. Such a setting is carried out in a manual manner by the worker.

Since the prior cooling fan is operated by hand, there is a problem that the cooling fan cannot cool the coil members by properly operating as the temperatures of the coil members are changes. In addition, as mentioned above, since the simulator is not provided with a control rod used in an actual control rod driving mechanism, the same load as an actual state cannot be provided. Therefore, it was impossible to carry out a correct verification and maintenance of the control rod driving mechanism control system.

These verification and maintenance operations are meant to set, regulate and verify voltage applied from the control rod driving mechanism control system. According to the prior simulator, since it is impossible to distinguish a correct timing of applied voltage or a magnitude of necessary applied voltage, when the simulator is applied to the control rod driving mechanism of an actual atomic reactor, it is impossible to correctly verify whether the control rod driving mechanism control system is properly operated or not.

SUMMARY OF THE INVENTION

Accordingly, the present invention has been made to solve the above-mentioned problems occurring in the prior art. The object of the present invention is to provide a control rod driving simulator suitable for a check of a function of an actual control rod driving mechanism control system and a maintenance by accurately simulating the load of a control rod driving mechanism provided to an actual atomic power plant and carrying out the verification.

In order to accomplish the objects, there is provided a control rod driving simulator for verification of a control rod driving mechanism control system of an atomic power plant comprising a control rod driving unit having a plurality of coil members vertically mounted therein; a control rod mounted vertical-movably through the centers of the coil members; a cart comprising a reserve tank storing cooling water, a cooling fan for air-cooling the coil members and a control unit controlling an operation of the cooling fan, the control rod driving unit being mounted to an upper part of the cart; a box installed in the cart, a part of the control rod being inserted in the box; and a checking unit for checking the vertical movement of the control rod.

The checking unit may comprise a checking window formed on one side of the box to see an interior of the box and a displaying part having graduations formed along a longitudinal direction of the checking window and numerically displaying a travel of the control rod.

According to an embodiment of the invention, one or more weight bodies may be fitted to a lower part of the control rod.

Preferably, a nut may be fastened to a lower part of the control rod and a clamp may be provided to an uppermost weight body, thereby inhibiting the weight bodies from being shaken and released Preferably, the simulator according to the invention may further comprise a fixing member fitted between the uppermost weight body and the clamp to prevent a shake of the weight bodies more reliably.

According to a preferred embodiment of the invention, the simulator may further comprise an absorbing member provided to a bottom surface of the box and absorbing a shock by the weight bodies.

In addition, a temperature sensor for sensing temperatures of the coil members may be provided to the coil members, and the control unit may control the driving of the cooling fan depending on the temperatures sensed by the sensor.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
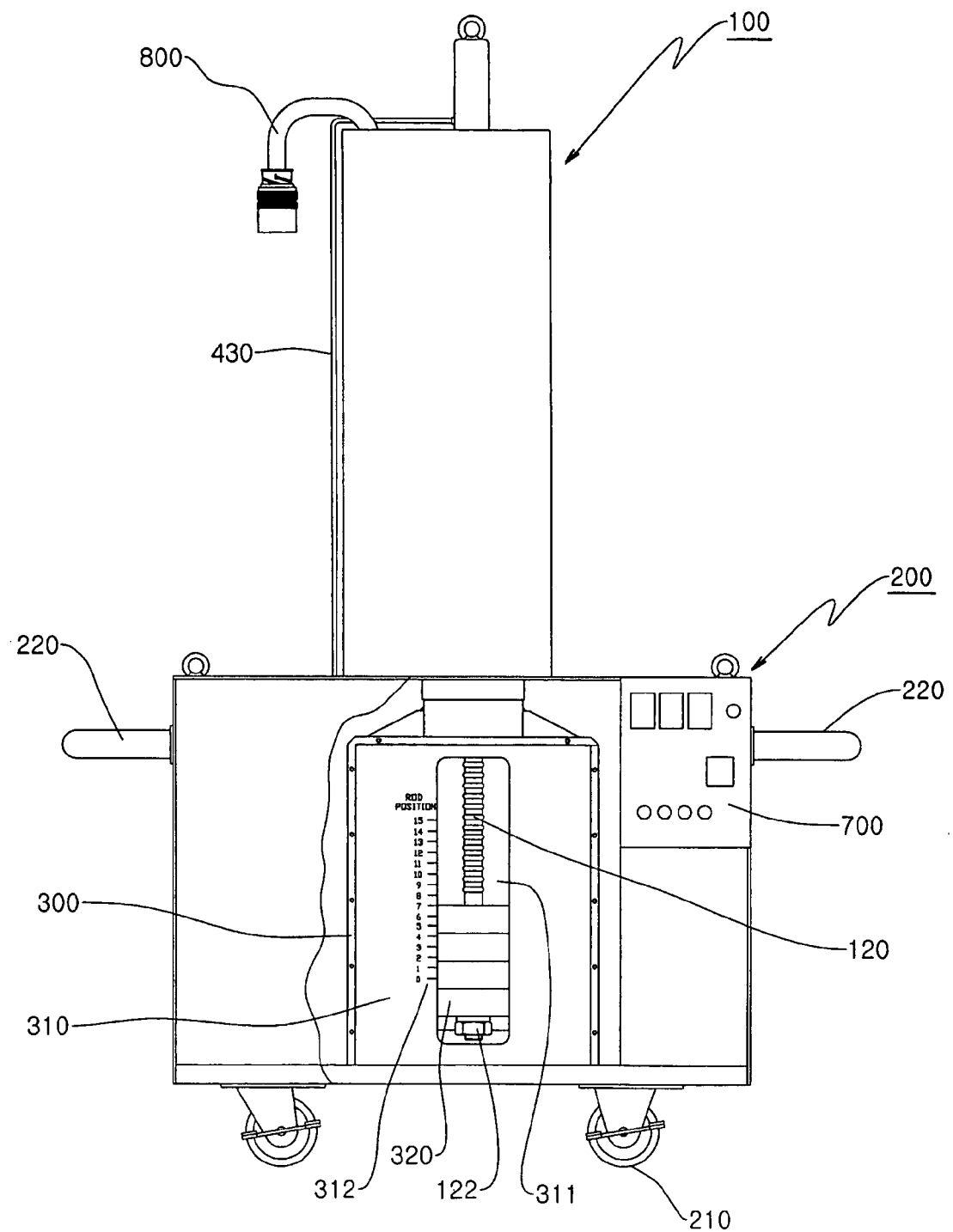
FIG. 1 is a front view showing a control rod driving simulator for verification of an atomic power plant according to an embodiment of the invention.
Figure 2:
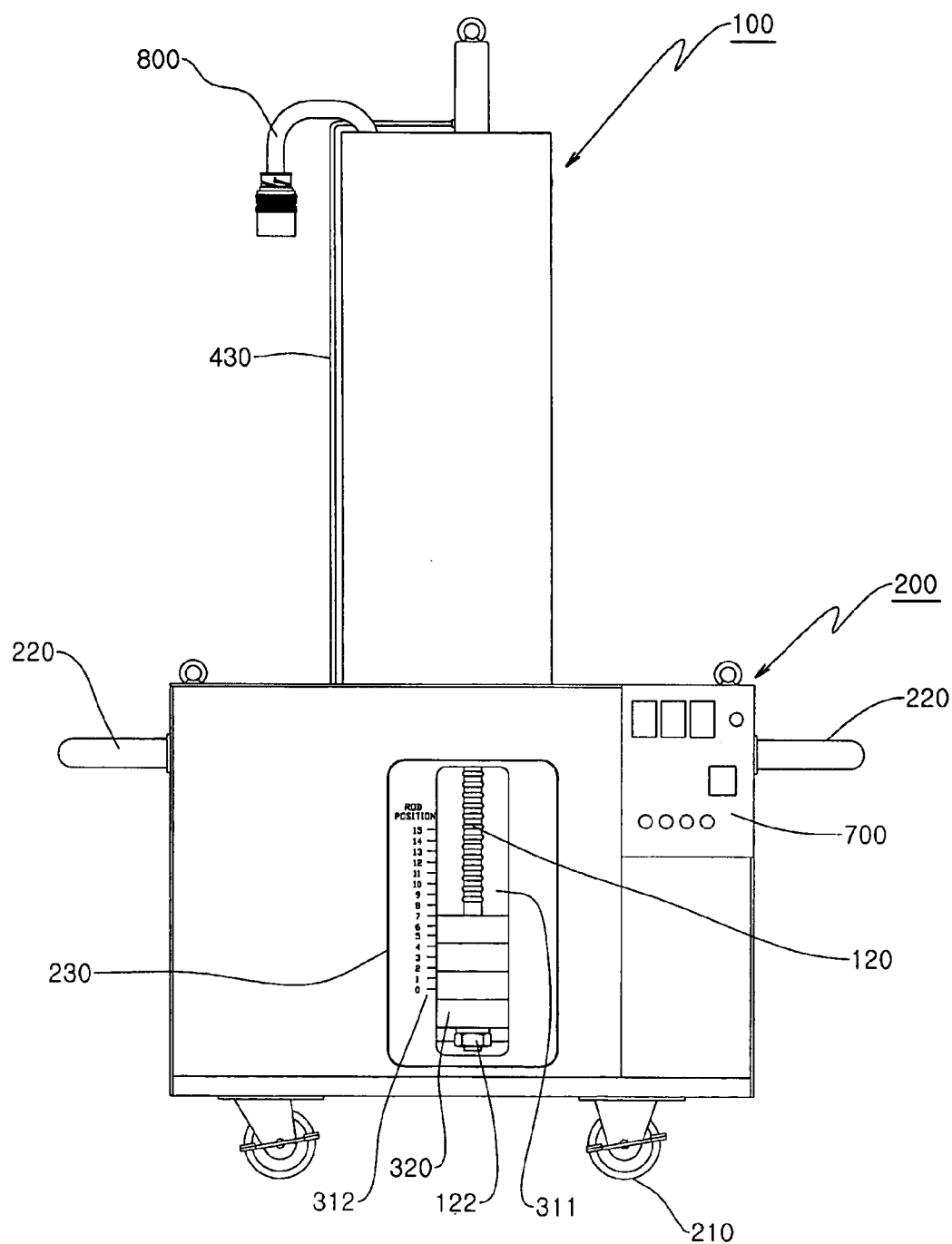
FIG. 2 is a partially united view showing a front of a box according to an embodiment of the invention.
Figure 3:
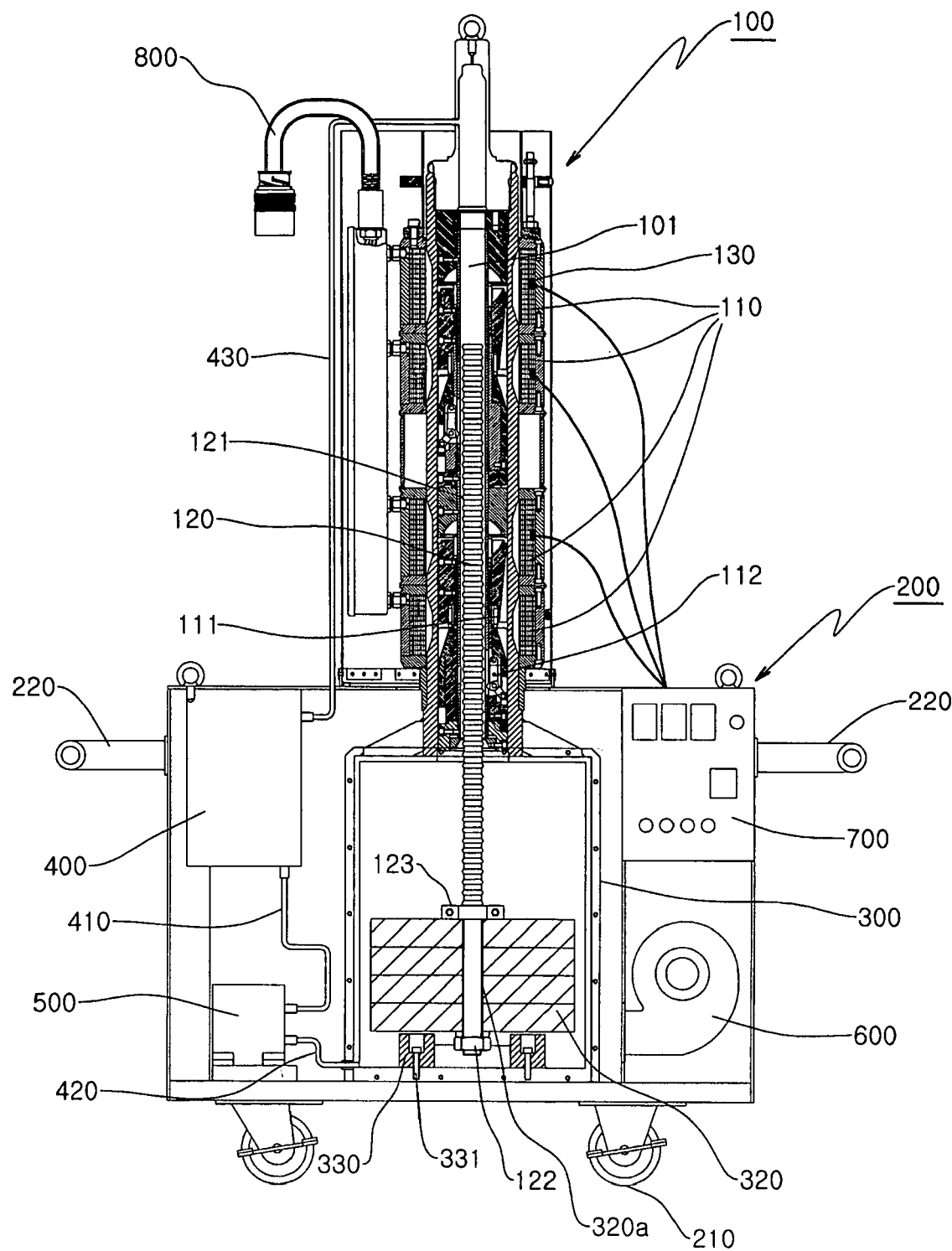
FIG. 3 is a sectional view showing a whole structure of the simulator according to an embodiment of the invention.
Figure 4:
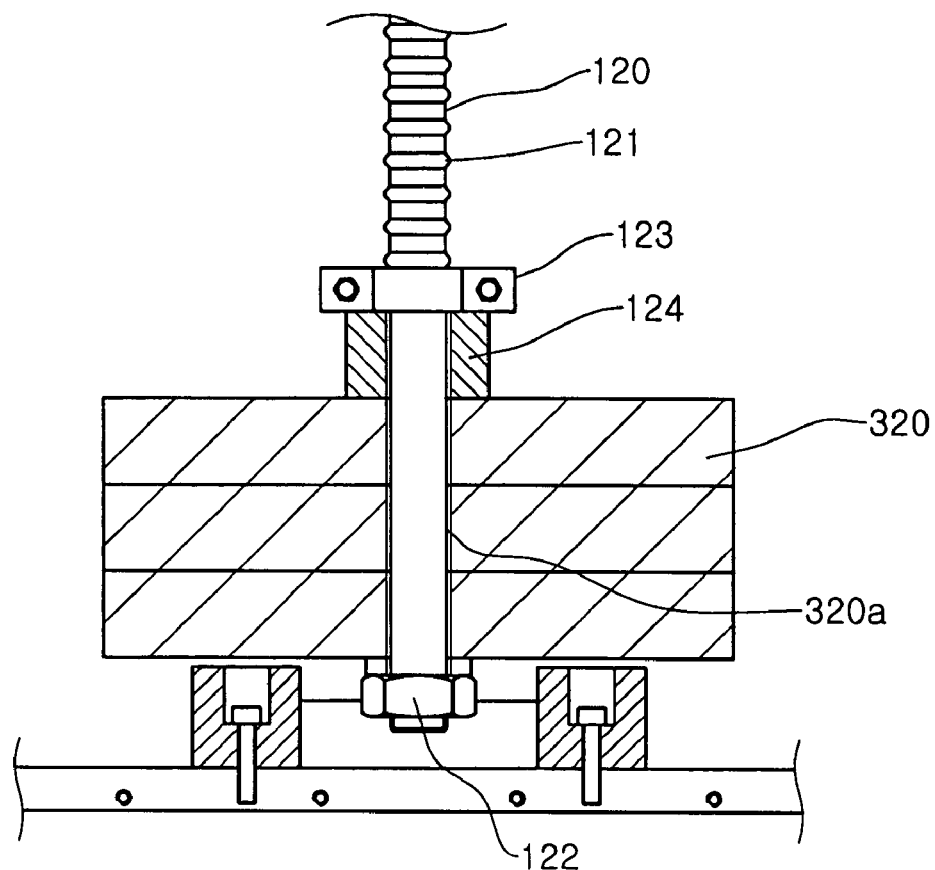
FIG. 4 is a partially enlarged view showing another installation structure of weight bodies mounted to a lower part of a control rod shown in FIG. 3.
Figure 5:
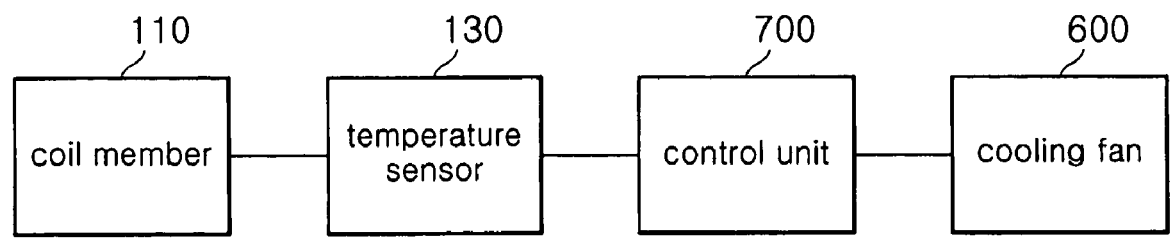
FIG. 5 is a block diagram for the purpose of illustrating a connection state of a temperature sensor in the simulator according to an embodiment of the invention.
Figure 6:
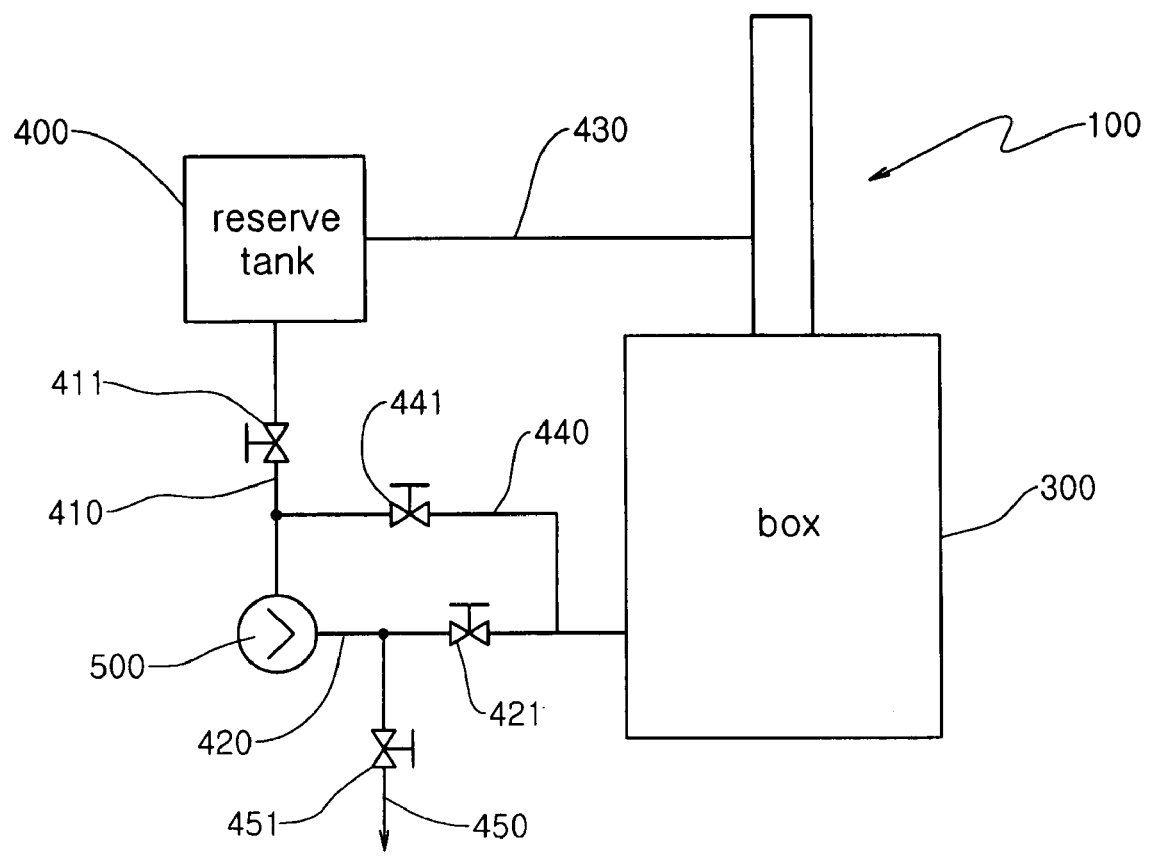
FIG. 6 is a schematic view showing a cooling water piping structure in the simulator according to an embodiment of the invention.

FIG. 1 is a front view showing a simulator according to an embodiment of the invention, FIG. 2 is a partially united view of FIG. 1, FIG. 3 is a sectional view showing a whole structure of the simulator according to an embodiment of the invention, FIG. 4 is a partially enlarged view showing another installation structure of weight bodies mounted to a lower part of a control rod, FIG. 5 is a block diagram for the purpose of illustrating a connection state of a temperature sensor in the simulator according to an embodiment of the invention and FIG. 6 is a schematic view showing a cooling water piping structure in the simulator according to an embodiment of the invention.

As shown in FIG. 1, a simulator according to an embodiment of the invention comprises a control rod driving unit 100 and a cart 200 movably equipped to a lower part of the driving unit 100.

The control rod driving unit 100 is an airtight housing shape and comprises a plurality of coil members 110 therein (FIG. 3). According to an embodiment of the invention, there are provided four coil members 110.

As shown in FIGS. 2 and 3, a passage 101 for control rod movement is formed in a center of the control rod driving unit 100, and a control rod 120 is vertically movably installed in the passage 101.

The cart 200 is also provided with a box 300 having a predetermined size and an airtight shape therein. A part of the control rod 120 is slidably inserted in the box 300.

A checking unit 310 is provided to the box 300 for checking a movement state of the control rod 120.

As shown in FIG. 2, the checking unit 310 has a checking window 311 formed on one side of the box 300 to see an interior of the box 300 and a displaying part 312 having a plurality of graduations formed along a longitudinal direction of the checking window 311 and numerically displaying a travel of the control rod 120.

One or more weight bodies 320 are fitted to a part of the control rod 120 located in the box 300.

The part of the control rod 120 has a flat surface to easily fit the weight body 320. A through-hole 320a is formed in a center of the weight body 320 to be easily fitted to the control rod 120. The through-hole 320a may have various polygonal shapes such as a quadrangle and a hexagon, etc. Due to such a structure, the weight bodies 320 are not rotated about the control rod 120.

A nut 122 is fastened to the lower part of the control rod 120 to which the weight bodies 320 are fitted and a clamp 123 is fasten-fixed to an uppermost one of stacked weight bodies 320 so that the weight bodied are not released. The clamp 123 may be a typical clamp having a structure that a pair of semicircular members is put into contacts each other and fastened with a bolt.

The weight bodies 320 fitted to the control rod 120 may be appropriately increased/decreased for conforming to weight of an assembly of control rods (for example, an assembly of 12 control rods or an assembly of 4 control rods) actually applied to an atomic reactor.

For example, in FIG. 3, four weight bodies 320 are provided and tested, but three weight bodies 320 may be fitted and tested as shown in FIG. 4. When the three weight bodies 320 are used as shown in FIG. 4, a fixing member 124 is fitted between the fastened clamp 123 and the uppermost weight body 320 so that the weight bodies 320 are not shaken.

A plurality of ring-shaped protrusions 121 is longitudinally formed on the control rod 120. When a power is applied to the coil members 110, a plurality of electromagnets 111 provided at an interval around of the control rod 120 is moved and thus a latch 112 connected to the electromagnet 111 is protruded toward the control rod 120. The latch 112 rises or descends in a state of being latched to the protrusions 121. Such structure and operation are same as those of a control rod driving mechanism equipped to an atomic reactor of an atomic power plant. That is, these are well known in the related-art and thus the detailed descriptions thereof are omitted.

An absorbing member 330 is provided to a bottom surface of the box to absorb a shock of the weight bodies 320. The absorbing member 330 is formed of dustproof rubber to be able to absorb a shock of the weight bodies 320 when the control rod 120 descends, quadrangle-shaped and fasten-fixed by a bolt 331 (or a typical fastening means such as a screw).

The absorbing member 330 can be replaced with a spring in place of the dustproof rubber. In addition, other means having a shock absorbing function may be used.

Meanwhile, in the simulator according to an embodiment of the invention, means for supplying cooling water to an interior of the box 300 and means for cooling the coil member 110 heated by applying the power are provide in the cart 200.

As shown in FIG. 5, the simulator has a cooling fan 600 as a cooling means for inhibiting the temperatures of the coil members 110 from rising, and a control unit 700 for generally controlling the driving of the simulator in one side of the cart 200.

A temperature sensor 130 is provided to the coil member 110 to appropriately regulate rpm of the cooling fan 600 by sensing the temperature rising of the coil member 110 when the power is applied to the coil member 110 and thus the temperature thereof rises. Since the sensor 130 is electrically connected to the control unit 700, the control unit 700 receives a temperature signal from the sensor 130 and thus controls the driving of the cooling fan 600.

As shown in FIG. 6, the cooling water-supplying means has a reserve tank 400 for storing cooling water and a pump 500 for supplying the cooling water in the reserve tank 400 into the box 300. The reserve tank 400 and the pump 500 are installed in the cart 200 (FIG. 3). Pipelines 410, 420 in which the cooling water flows are respectively provided between the reserve tank 400 and the pump 500 and between the pump 500 and the box 300. A circulating pipeline 430 is connected between the reserve tank 400 and the control rod driving unit 100.

The cooling water in the reserve tank 400 is supplied to the box 300 via the pipelines 410, 420 by the pump 500. The cooling water supplied to the box 300 fills up the control rod driving unit 100. Then, the cooling water is again supplied to the reserve tank 400 in the cart 200 via the circulating pipeline 430 connected to one side of the control rod driving unit 100 and circulated.

A recovery pipeline 440 bypassing the pump 500 is connected to the pipelines 410, 420 and a discharge pipeline 450 for discharging the cooling water is connected to a middle of the pipeline 420 connecting the pump 500 and the box 300.

Valves 411, 421, 441, 451 for opening or interrupting the flow of the cooling water are respectively provided to each of the pipelines 410, 420, 440, 450.

The recovery pipeline 440 is connected from the pipeline 420 connecting the pump 500 and the box 300 to the pipeline 410 connecting the reserve tank 400 and the pump 500. The discharge pipeline 450 is connected to the pipeline 420 between the pump 500 and the valve 421 and discharges the cooling water from the pump 500 to an exterior.

In the simulator having such a structure, in case of that it is desired to discharge all the cooling water filled up in the simulator, when the valve 411 of the pipeline 410 and the valve 421 of the pipeline 420 are closed and the valve 441 of the recovery pipeline 440 and the valve 451 of the discharge pipeline 450 are opened, the cooling water filled up in the box 300 flows out from the recovery pipeline 440 and is quickly discharged via the discharge pipeline 450 by the pump 500. In case of that it is desired to supply the cooling water and thus fill up the box 300, under a state of that the valves 441, 451 provided to the recovery pipeline 440 and the discharge pipeline 450 are closed and the valves 411, 421 provided to the pipelines 410, 420 are opened, the pump 500 is operated and thus the cooling water in the reserve tank 400 is supplied to the box 300.

The cooling water has a buffering function of reducing the contacts with each of the parts when the control rod 120 is operated and a lubricating function of smoothly operating the control rod 120 as well as a basic cooling function.

A caster 210 is provided to the bottom part of the cart 200 to easily move the cart 200 and handles 220 are respectively provided to both sides of the upper part of the cart to easily manipulate the cart.

Reference numeral 800 indicates a power cable connecting a control rod driving mechanism control system (not shown) and the coil members 110 in the control rod driving mechanism 100. The power is supplied to the coil members 110 via the power cable 800 and thus the control rod driving mechanism 100 is operated.

When the simulator according to an embodiment of the invention is operated, the control rod 120 is vertically moved or stopped according to a power sequence applied to the four coil members 110. At this time, the travel of the control rod 120 can be easily checked by a seeing through part 230 formed on a front side of the cart 200 (FIG. 1).

That is, the travel of the control rod 120 can be easily measured by checking the graduations of the displaying part 312 formed on the checking window 311 of the front side of the box 300.

As explained above, when the simulator according to en embodiment of the invention is connected to a control rod driving mechanism control system actually equipped to an atomic power plant and then a wave profile of current flowing in the coil members of the control rod driving unit is measured, a same wave profile of current as when it is connected to an actual control rod driving mechanism provided to a reactor core can be obtained.

In addition, according to the invention, the temperature sensor is attached to each of the coil members, the rpm of the cooling fan is controlled depending on the temperature measured by the sensor and thus an amount of cooling air flowing in the control rod driving mechanism is automatically regulated, making it possible for the control rod driving mechanism to be operated in a same temperature as an actual power plant.

In addition, according to the invention, it is possible to correctly carry out a simulation test since voltage setting, control and function verification of the control rod driving mechanism control system are checked with naked eyes by checking the vertical travel of the control rod with naked eyes. Accordingly, it is possible to improve the confidence and stability of the simulator.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A control rod driving simulator for verification of a control rod driving mechanism control system of an atomic power plant comprising:

a control rod driving unit having a plurality of coil members vertically mounted therein;

a control rod mounted vertically movably through the centers of the coil members;

a cart having a reserve tank storing cooling water, a cooling fan for air-cooling the coil members, and a control unit for controlling an operation of the cooling fan, the control rod driving unit being mounted to an upper part of the cart;

a box installed in the cart, a part of the control rod being inserted in the box; and a checking unit for checking the vertical movement of the control rod; and one or more weight bodies being fitted to a lower part of the control rod.

2. The simulator according to claim 1, wherein the checking unit comprises a checking window formed on one side of the box to see an interior of the box and a displaying part having graduations formed along a longitudinal direction of the checking window and numerically displaying a travel of the control rod.

3. The simulator according to claim 1, wherein a nut is fastened to the lower part of the control rod and a clamp is provided to an uppermost weight body, thereby inhibiting the weight bodies from being shaken and released.

4. The simulator according to claim 3, further comprising a fixing member fitted between the uppermost weight body and the clamp and preventing the weight bodies from being shaken.

5. The simulator according to claim 1, further comprising an absorbing member provided to a bottom surface of the box and absorbing a shock by the weight bodies.

6. The simulator according to claim 1, wherein a temperature sensor for sensing temperatures of the coil members is provided to the coil members, and the control unit controls the driving of the cooling fan depending on the temperatures sensed by the sensor.

* * * * *